United States Patent
Stockdale et al.

(10) Patent No.: US 7,243,008 B2
(45) Date of Patent: Jul. 10, 2007

(54) AUTOMATED INTEL DATA RADIO

(75) Inventors: Sandra Erich Stockdale, Endicott, NY (US); Chris A. Bodenhorn, Vestal, NY (US); Mark P. Botzenhart, Owego, NY (US)

(73) Assignee: Lockheed Martin, Owego, NY (US)

( * ) Notice: Subject to any disclaimer, the term of this patent is extended or adjusted under 35 U.S.C. 154(b) by 5 days.

(21) Appl. No.: 10/459,696

(22) Filed: Jun. 11, 2003

(65) Prior Publication Data

US 2004/0030463 A1    Feb. 12, 2004

Related U.S. Application Data

(60) Provisional application No. 60/387,839, filed on Jun. 11, 2002.

(51) Int. Cl.
*B64C 1/00* (2006.01)
(52) U.S. Cl. .......................................................... 701/3
(58) Field of Classification Search ................ 701/1, 701/3–4, 9–11, 14, 120, 300–302; 244/220–221; 342/29, 32, 36–38
See application file for complete search history.

(56) References Cited

U.S. PATENT DOCUMENTS

| | | |
|---|---|---|
| 5,187,667 A | 2/1993 | Short |
| 5,272,652 A | 12/1993 | Rosenshein et al. |
| 5,303,393 A | 4/1994 | Noreen et al. |
| 5,559,707 A | 9/1996 | DeLorme et al. |
| 5,596,605 A | 1/1997 | Kiyanagi et al. |
| 5,610,839 A | 3/1997 | Karolak et al. |
| 5,633,946 A | 5/1997 | Lachinski et al. |
| 5,659,582 A | 8/1997 | Kojima et al. |
| 5,798,733 A | 8/1998 | Ethridge |
| 5,850,617 A | 12/1998 | Libby |
| 5,883,586 A | 3/1999 | Tran et al. |
| 5,936,552 A | 8/1999 | Wichgers et al. |
| 6,020,845 A * | 2/2000 | Weinberg et al. ........... 342/354 |
| 6,021,374 A | 2/2000 | Wood |
| 6,175,804 B1 | 1/2001 | Szczerba |
| 6,178,207 B1 | 1/2001 | Richards et al. |
| 6,222,464 B1 | 4/2001 | Tinkel et al. |
| 6,232,932 B1 | 5/2001 | Thorner |
| 6,266,610 B1 | 7/2001 | Schultz et al. |
| 6,334,344 B1 * | 1/2002 | Bonhoure et al. ............. 70/11 |
| 6,392,661 B1 | 5/2002 | Tankersley |
| 6,430,480 B1 | 8/2002 | Ammar et al. |
| 6,542,796 B1 | 4/2003 | Gibbs et al. |
| 2001/0006372 A1 | 7/2001 | Lemelson et al. |
| 2001/0027389 A1 | 10/2001 | Beverina et al. |
| 2002/0004692 A1 | 1/2002 | Nicosia et al. |
| 2002/0032733 A1 | 3/2002 | Howard |
| 2002/0073101 A1 | 6/2002 | Stoyen |
| 2002/0082769 A1 | 6/2002 | Church et al. |
| 2002/0087572 A1 | 7/2002 | Hopkins |
| 2004/0007121 A1 * | 1/2004 | Graves et al. ............... 89/1.11 |
| 2004/0243378 A1 * | 12/2004 | Schnatterly et al. .......... 703/22 |

FOREIGN PATENT DOCUMENTS

DE    40 26 207 A1    2/1992

* cited by examiner

*Primary Examiner*—Thu V. Nguyen
(74) *Attorney, Agent, or Firm*—Marjama & Bilinski LLP (57) ABSTRACT

The present invention is directed to a system for automating mission related tasks in a tactical environment. The system includes a receiver component configured to receive intelligence data. The intelligence data describes the tactical environment in real-time, or in near real-time. A computer is coupled to the receiver component. The computer is programmed to process the intelligence data, identify mission adjustments based on the processed intelligence data, and to effect the mission adjustments by automatically implementing the mission related tasks. A display component is coupled to the computer. The display component is configured to display at least a portion of the tactical environment and provide at least one visual indicator corresponding to the mission adjustments and/or the mission related tasks.

44 Claims, 6 Drawing Sheets

AUTOMATED INTEL DATA RADIO

CROSS-REFERENCE TO RELATED APPLICATIONS

This application claims priority under 35 U.S.C. §119(e) based on U.S. Provisional Patent Application Ser. No. 60/387,839, entitled AUTOMATED INTEL DATA RADIO, filed Jun. 11, 2002, the contents of which are relied upon and incorporated herein by reference in their entirety.

BACKGROUND OF THE INVENTION

1. Field of the Invention

The present invention relates generally to decision-aiding systems, and particularly to an automated battlefield management system.

2. Technical Background

Information technology is changing the way military operations are conducted. The components of joint military forces, including aircraft, mechanized infantry, and other ground based units must have a superior knowledge of the threat environment to efficiently accomplish their missions. For example, military aircraft typically fly their missions as part of an integrated task force battle plan. Each route must be extensively planned with respect to known threats, threat locations, and threat capabilities. Each unit that is deployed to execute the integrated battle plan must coordinate their activities with other units. This coordination requires timely and manageable information.

The goal of military planners is to provide each joint task force with "decision superiority." This is defined as the ability to make superior decisions, and implement those decisions, before the enemy can react.

In one approach that has been considered, digital mapping systems have been configured to display the characteristics of the terrain around the aircraft, the location of the aircraft relative to the terrain, the flight path of the aircraft, and the location of the threats relative to the aircraft. The display may also provide information that indicates the visibility of the aircraft relative to the threat and possible flight paths for the aircraft to avoid detection by the threats. Unfortunately, the displayed information is stale. One drawback to this approach relates to the fact that the map image is pre-processed and does not include dynamic elements of real-time mission scenes.

In another approach that has been considered, military aircraft platforms have been equipped with a satellite communications receiver that provides "over-the-horizon" real-time, or near real time, threat information that allows crews to avoid and counter threats. This information may be displayed on a digital map similar to the one described above. The threat information obtained using the methods described above may be employed by the crew to re-plan the mission en-route, if necessary. One disadvantage to this approach is that the information displayed on the digital map must be assessed manually. Further, if a new route is needed, the route must also be plotted manually.

Accordingly, what is needed is a system that automates manual tasks to provide increased situational awareness with no additional burden on the pilot and/or the flight crew. Situational awareness refers to providing a pilot and/or crew with access to the entire battlefield environment, while at the same time, reducing the probability of detection by enemy forces. Thus, it would be desirable to provide an automated system that determines the impact of intelligence data on the route, re-plot the route, and update the mission plan in response to the new intelligence data. What is also needed is a system that is configured to locate and track the locations of combat survivors, and plot a efficient route to the pick up point.

SUMMARY OF THE INVENTION

The present invention is directed to a system that provides "over-the-horizon" real-time, or near real time threat data, to update the vehicle's mission plan without increasing the crew's workload. Thus, the present invention provides a system that automates manual tasks to thereby increase situational awareness with no additional burden on the pilot and/or the flight crew. The system of the present invention is configured to determine the impact of intelligence data on the route, adjust the route when necessary to avoid a particular threat, and/or update the mission plan in response to the new intelligence data. The present invention is also configured to locate and track the locations of combat survivors, and plot a efficient route to the survivor pick-up point.

One aspect of the present invention is a system for automating mission related tasks in a tactical environment. The system includes a receiver component configured to receive intelligence data. The intelligence data describes the tactical environment in real-time, or in near real-time. A computer is coupled to the receiver component. The computer is programmed to process the intelligence data, identify mission adjustments based on the processed intelligence data, and to effect the mission adjustments by automatically implementing the mission related tasks. A display component is coupled to the computer. The display component is configured to display at least a portion of the tactical environment and provide at least one visual indicator corresponding to the mission adjustments and/or the mission related tasks.

In another aspect, the present invention includes a method for automating mission related tasks in a vehicle operating in a tactical environment. The method includes receiving intelligence data from a intelligence broadcast. The intelligence data describes the tactical environment in real-time, or in near real-time. The intelligence data is processed to thereby identify mission adjustments required to respond to the tactical environment. The mission related tasks are performed to effect the mission adjustments. At least one visual indicator corresponding to either the mission adjustments and/or the mission related tasks is displayed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the automated intelligent data radio of the present invention is shown in FIG. 1, and is designated generally throughout by reference numeral 10.

In accordance with the invention, the present invention is directed to a system for automating mission related tasks in a tactical environment. The system includes a receiver component configured to receive intelligence data. The intelligence data describes the tactical environment in real-time, or in near real-time. A computer is coupled to the receiver component. The computer is programmed to process the intelligence data, identify mission adjustments based on the processed intelligence data, and to effect the mission adjustments by automatically implementing the mission related tasks. A display component is coupled to the computer. The display component is configured to display at least a portion of the tactical environment and provide at least one visual indicator corresponding to the mission adjustments and/or the mission related tasks.

Thus, the present invention is directed to a system that provides "over-the-horizon" real-time, or near real time threat data, to update the vehicle's mission plan without increasing the crew's workload. Thus, the present invention provides a system that automates manual tasks to thereby increase situational awareness with no additional burden on the pilot and/or the flight crew. The system of the present invention is configured to determine the impact of intelligence data on the route, adjust the route when necessary to avoid a particular threat, and/or update the mission plan in response to the new intelligence data. The present invention is also configured to locate and track the locations of combat survivors, and plot a efficient route to the survivor pick-up point.

Figure 1:
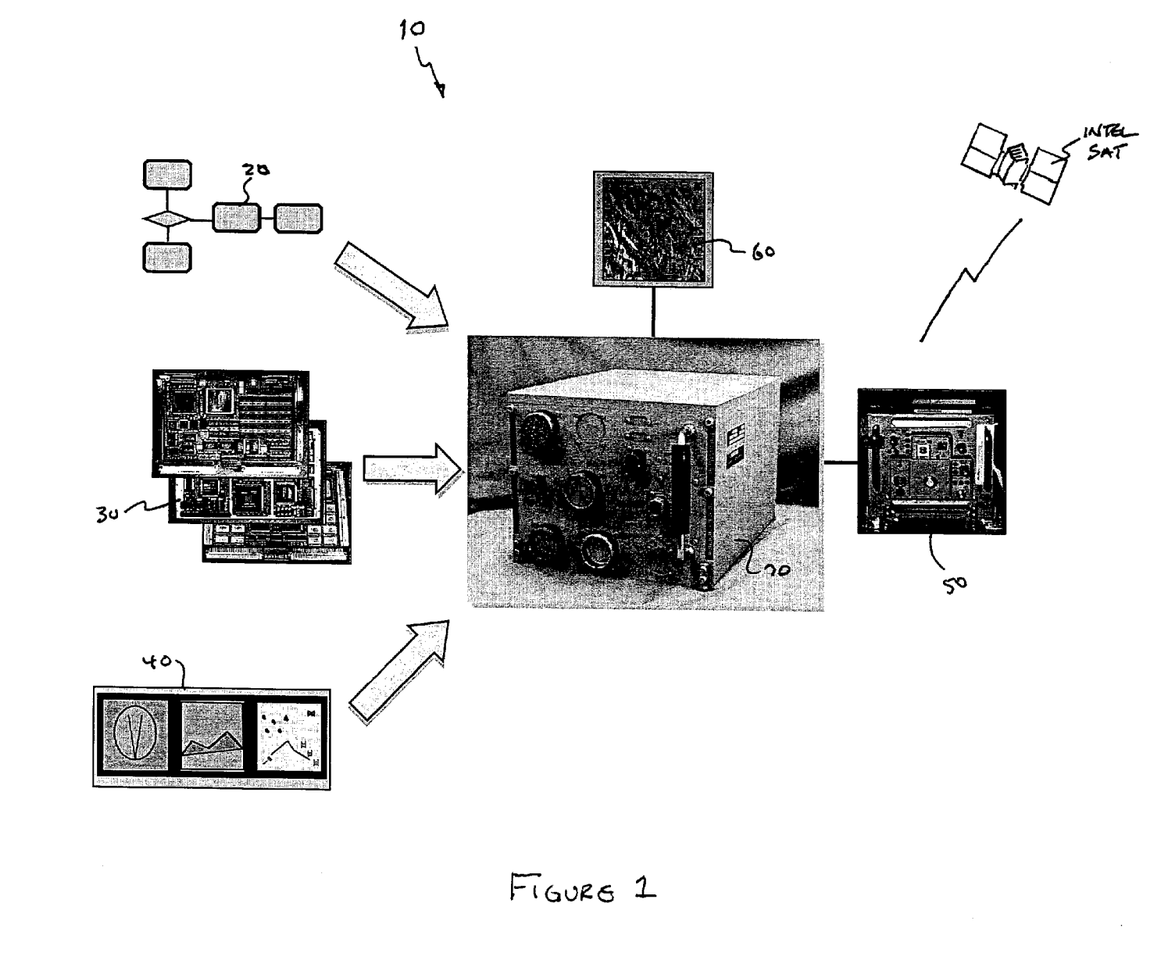
FIG. 1 is a diagrammatic depiction of the Automated Intel Data Radio in accordance with an embodiment of the present invention.

As embodied herein, and depicted in FIG. 1, a diagrammatic depiction of the Automated Intel Data Radio (AIDR) 10 in accordance with an embodiment of the present invention is disclosed. AIDR 10 includes decision aiding/receiver management software 20 residing on single board computing hardware package 30. Software digital maps 40 also reside in the memory portion of hardware 30. Hardware 30 is disposed in enclosure 70. As shown, enclosure 70 includes a plurality of connectors which provide system 10 with communications to external devices. Each of the connectors disposed on the exterior of enclosure 70 are connected to transmission media disposed in the interior of enclosure 70. In one embodiment, the transmission media terminate on a full ATR short chassis backplane (not shown). For example, operator control and display (C/D) equipment 60, Intelligence Broadcast Receiver (IBR) 50, and aircraft avionics and control systems are coupled to hardware 30 by cabling that terminates on the connectors disposed on the exterior of enclosure 70.

The backplane chassis includes connector slots that accommodate the printed circuit boards that comprise hardware package 30. In one embodiment of the present invention, hardware 30 includes four printed circuit boards that plug into the backplane. Two of the boards are SP-103 Power-PC single board computers, another board is a graphics video card, and the fourth board includes mass memory. The mass memory stores the map and decision aiding databases. The first single board computer controls the graphics video card and the digital mapping software to generate digital map video. The map video includes intelligence symbology, track symbology, and flight plan information superimposed over the digital map. The second single board computer hosts and executes the decision aiding software that includes route planning, plan monitor, and receiver management software modules. The second single board computer also controls the external interfaces discussed above, e.g., with C/D equipment 60, IBR 50, and aircraft avionics and control systems. These interfaces include MIL-STD-1553, Ethernet, and RS-422/232 interfaces. The graphics card also includes an RS-170 interface. AIDR system 10 is extendable to include multi-source data fusion. Multi-source data fusion combines data from on and off-board data sources into a single-track file, representing a best picture of the battlefield situation. The error ellipses that characterize the composite track converge much more rapidly to a level of accuracy that permits engagements when information from multiple sensors is available and utilized.

According to one embodiment of the invention, the methods of the present invention are performed by the single board computer when the on-board processor executes an arrangement of instructions contained on the mass memory board which may include various types of computer-readable media. These instructions are typically read into a RAM from a ROM. Data and instructions may also be imported from external computer-readable media. Execution of the arrangement of instructions contained in RAM causes the on-board processor to perform the process steps described herein.

It will be apparent to those of ordinary skill in the pertinent art that modifications and variations can be made to the on-board processor depending on cost, availability, speed and timing, and other design or performance considerations. For example, the processor may be implemented using a processor of the type manufactured by Intel, AMD, Motorola, or by other manufacturer's of comparable devices. The on-board processor may also include a reduced instruction set (RISC) processor or application specific integrated circuits (ASICs). In alternative embodiments, hard-wired circuitry may be used in place of or in combination with software instructions to implement the present invention. Thus, the implementation of the present invention is not limited to any specific combination of hardware circuitry and software.

The term "computer-readable medium" as used herein refers to any medium that participates in providing or storing instructions or data for use in system 10, or providing instructions to the processor for execution. Such a medium may take many forms, including but not limited to nonvolatile media, volatile media, and transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Those of ordinary skill in the art will recognize that transmission media may be of any suitable type. Transmission media may take the form of copper wire, coaxial cable, acoustic media, fiber-optic media, or electromagnetic waves, such as those generated during radio frequency (RF) and infrared (IR) data communications.

Operator control and display (C/D) equipment 60 may be of any suitable type of equipment. C/D equipment 60 includes an operator display, such as a cathode ray tube (CRT), liquid crystal display, active matrix display, or plasma display, for displaying information to an operator. C/D equipment 60 also includes at least one input device for communicating information and command selections to the on-board processors disposed on the single board computers. The in put device may include a keyboard having alphanumeric and other keys, and/or a cursor control, such as a mouse, a trackball, or cursor direction keys, for communicating direction information and command selections to the on-board processors disposed on the single board computers. Obviously, cursor control also controls cursor movement on the display.

IBR 50 may be of any suitable type, but there is shown by way of example a Multi-Mission Advanced Tactical Terminal (MATT) of the type manufactured by Raytheon Corporation. In another embodiment, IBR 50 may be the Concord Radio, manufactured by Engineering Development Laboratories, Incorporated. IBR provides system 10 with access to the total battlefield situation, through near real-time Electronic Order of Battle updates via satellite communications. The near real-time threat broadcasts over-the-horizon offer a new level of detection avoidance, allowing the crews to avoid and defeat threats, and to re-plan en route if needed. Those of ordinary skill in the art will also recognize that IBR 50 may receive broadcast intelligence data from any source including ground based sources, air-based sources, sea-based sources, and/or sources disposed on under-sea platforms. These sources may include a tactical internet, a data link, an RF transmission, an optical transmission, and/or any other suitable intelligence source. IBR 50 may be disposed in aircraft (fixed wing, helicopters, and etc.), land vehicle platforms, naval platforms, and/or at fixed-site platforms. Thus, the present invention is applicable to all such platforms.

Figure 2:
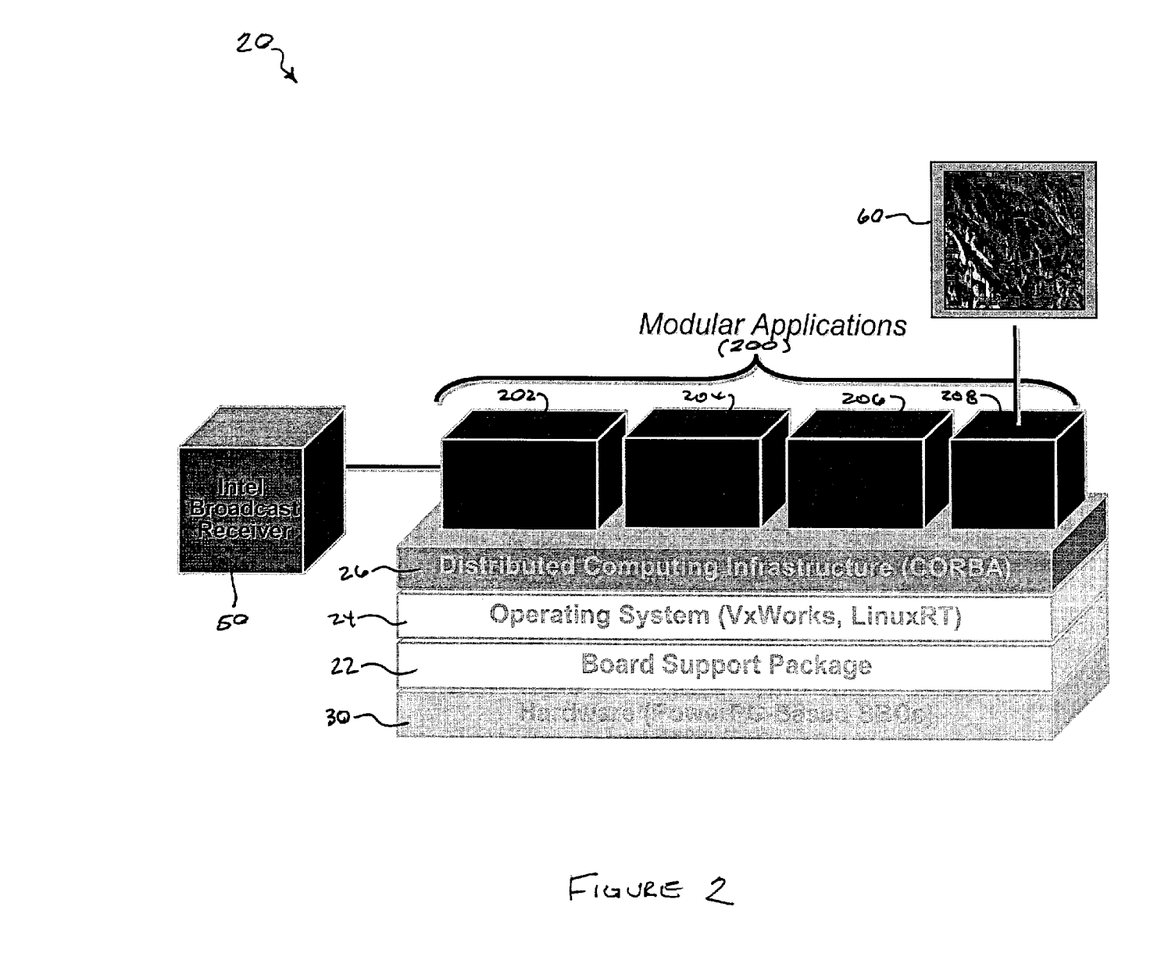
FIG. 2 is a block diagram of the system software components in accordance with an embodiment of the present invention.

Referring to FIG. 2, a block diagram of the system software components 20 in accordance with an embodiment of the present invention is disclosed. System software 20 uses a layered and distributed approach with four layers as the foundation for the application software. The first layer includes ruggedized Commercial-off-the-Shelf hardware package 30, which was described above in detail. The second layer includes processor board support package 22, a real-time operating system 24, and a distributed communication approach based on Common Object Request Broker Architecture (CORBA) and the CORBA Event Service layer 26. The software architecture employs an Open Systems Architecture that is consistent with the Real-Time Defense Information Infrastructure Common Operating Environment (DII COE) standardization effort. This architecture was validated as part of the Army's Rotorcraft Vehicle Management System (RVMS) program.

Distributed computing infrastructure 26 supports receiver management application 202, plan monitor application 204, route planning application 206, and digital mapping application 208. As shown, receiver management application is used to control IBR 50. Digital mapping application 208 provides the digital maps and the superimposed symbology that is provided on C/D 60.

Receiver management application 202 performs several functions. First, receiver management application 202 establishes the operating modes for the Intel Receiver channels. For example, it sets the frequency, baud rate, and dwell time of IBR 50 in accordance mission planning data.

Second, receiver management application 202 obtains real-time or near real time, over-the-horizon tracks from IBR 50. IBR 50 receives this data from a satellite communications link. The intelligence provided by IBR 50 allows users to avoid or counter threats, and to retrieve survivors. IBR 50 also receives information on friendly locations for enhanced situational awareness. IBR 50 has an embedded correlator that associates newly reported emitter parameters with those previously reported contacts and known radar sites. If the contact report was associated, the new data is used to update the track record. If the new report is unassociated, a new track record is created. Receiver Management application 202 receives this track data for processing and provides the tracks for display on the digital map provided by C/D 60. In another embodiment, the correlator is implemented in software which resides on the second single board computer. Those of ordinary skill in the art will recognize that the correlator is a software function that may reside in any suitable place within the system.

Receiver Management application 202 also manages the filters employed by IBR 50. Filters are employed to limit the number of tracks displayed. The main purpose of the filters is to limit the amount of information that is presented to the operator to prevent "information over-load." One type of filter is a geographic area of interest filter, which is mission dependent. In other words, tracks not in the vicinity of the route are filtered out and not provided because they are of little interest to the mission. Thus, the filters limit the volume of tracks provided to receiver management Application 202 to optimize processor performance. Filter settings are selectable and may be changed during the mission by application 202.

There are two application modules that comprise the decision aiding software provided by AIDR system 10. These applications include Plan Monitor application 204 and Route Planning application 206. Plan Monitor application 204 continually monitors the battle-space picture as well as aircraft/avionics state to detect impacts to the mission plans such as route segments that are exposed to threats. Plan Monitor application 204 examines the current flight segment and the next flight segment in a flight plan. These segments of the route are analyzed to optimize processing time. If the entire route was analyzed, more processing time would be required, and the threat situation may change by the time the aircraft/vehicle makes it to that part of the route. If the route is impacted by a threat, then an automatic re-plan of the route is performed.

Route Planning application 206 recommends a route based on the terrain and the known and probable threats to minimize the probability of detection by threats along the route. For Combat Survivor Evader Location (CSEL) and threats, Route Planning application 206 provides a recommended route that is presented to the operator to accept, reject or edit. Route Planning application 206 can automatically re-plan the route upon receipt of a CSEL report from the Intel broadcast receiver to retrieve survivors. After receipt of a CSEL, the route is re-planned by selecting an appropriate path departure point along the current route and setting the CSEL geo-location as the destination location. C/D 60 shows the survivor location. AIDR system 10 provides coordinated recovery of combat crew/isolated personnel. Route Planning application 206 may also re-plan the route to engage a hostile target in response to receiving targeting information from IBR 50 and/or one of the platform's sensors.

Digital mapping application 208 uses mapping data obtained from NIMA. NIMA refers to the National Imagery and Mapping Agency. NIMA provides Geospatial Intelligence that includes imagery, imagery intelligence, and geospatial data and information. Digital mapping 208 also employs digitized chart maps and vector graphics maps employed by programs such as U2 and MH60R. Examples of digital mapping displays will be shown in more detail below, in relation to FIG. 5 and FIG. 6.

Figure 3:
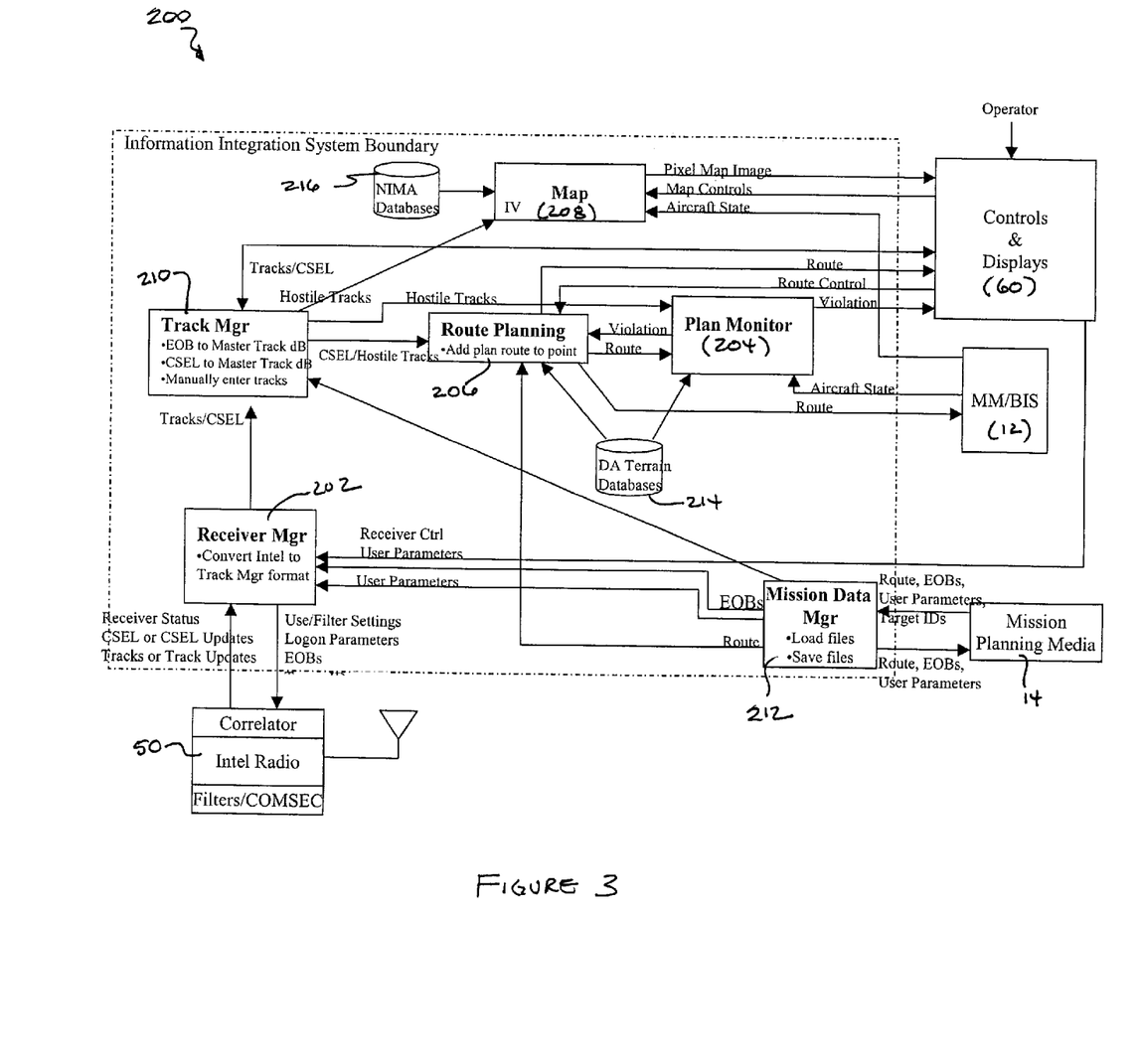
FIG. 3 is a functional block diagram of the system software in accordance with an embodiment of the present invention.

Referring to FIG. 3, a functional block diagram of the system software 200 in accordance with an embodiment of the present invention is disclosed. Mission planning 14 provides pre-mission support to AIDR system 10 applications and IBR 50 by defining their mission parameters and providing these parameters to AIDR 10 on the aircraft/platform. Mission planning is a ground based support entity external to AIDR system 10. Prior to the start of a mission, mission planning media 14 provides mission data manager 212 with the flight plan or route, the electronic order of battle (EOB), receiver parameters, identifies targets, and loads the map data for the geographic area of interest. This data is loaded and distributed by data manager 212. In particular, receiver manager 202 receives the EOB, receiver mission control parameters, and other user parameters. The EOB and target data is also provided to track manager 210. Finally, the mission route is provided to route planning application 206.

Once the mission is underway, receiver manager 202 uses the EOB and parameters received from mission data manager 212 to log onto IBR 50 and set the frequency, baud rate, and dwell time of IBR 50 in accordance with mission planning data, and adjust IBR 50 filter settings. IBR 50 continually provides receiver manager 202 with a status. Further, IBR 50 provides intelligence data, including hostile track, friendly track, and CSEL data obtained from the satellite communications link. Receiver manager 202 provides the track data and the CSEL data to track manager 210.

Track manager 210 maintains a master track database which includes EOB data, hostile tracks, friendly tracks, and CSEL tracks, whether obtained from IBR or from aircraft avionics. Track manager 210 is coupled to C/D 60 by way of a bi-directional communications channel that is used to communicate track and CSEL data therebetween. For example, track manager 210 may also provides C/D 60 with track data obtained from the platform's own sensors. C/D 60 provides track manager 210 with user updates to tracks and/or user entered tracks. Track manager 210 fuses this data to present a unified snapshot of the battlefield. After data fusion, track manager 210 also provides digital map application 208, route planner 206, C/D 60, and plan monitor 204 with track and CSEL data. As those of ordinary skill in the art will appreciate, track data may include track identification data, location data, threat detection radius, weapons status data, heading data, and speed data. Location data may be communicated using any suitable coordinate system for defining the position of a contact in three-dimension space. For example, a location may be defined using latitude, longitude, and altitude, or by using a three-dimension Cartesian coordinate grid system, or by using bearing, range, and altitude from a known point, and/or any other suitable system.

Decision aiding functionality is provided by route planning application 206 and plan monitor application 204. As noted above, prior to the mission, the digital map data is obtained from mission planning 14. Ultimately, it is stored in Decision aiding terrain database 214. Database 214 services both route planning 206 and plan monitor 204. When route planning application 206 plans a route, it minimizes exposure to threats within the context of mission constraints. Further, plan monitor 204 analyzes each potential route to determine if the threats pose an increased risk relative to the potential route. The risk analysis is based on the location, altitude, threat radius of each threat, in addition to the terrain. The decision aiding applications receive inputs from other sources as well. On-board mission manager 12 provides plan monitor 204 with aircraft/platform state data, such as course, speed, altitude, fuel status, and etc. In return, route planning 206 provides mission manager 12 with route information. Thus, a control loop is formed by route planning 206, plan monitor 204, and mission manager 12 ensuring that the operator follows the proper route. In another embodiment, the mission manager is coupled to the aircraft flight management system and the route information, i.e., route implementation commands, are used to implement route changes automatically.

Digital map application 208 receives input from mission manager 12, track manager 210, NIMA database 216, and C/D 60. Digital mapping application 208 obtains map data from NIMA database 216. Digital map application 208 superimposes track and CSEL data obtained from the track manager over the digital map obtained from NIMA database 216. Digital map application 208 also receives aircraft state data from mission manager 12. Thus, images provided to the operator via C/D 60 take into account terrain features, intelligence data, track data, aircraft/platform position, and aircraft/platform state data. Further, the images and views provided by map application 208 are controlled by the operator by way of map controls from C/D 60.

Thus, AIDR system 10 is configured to plan and monitor the route in response to inputs from terrain databases, aircraft/platform position data, IBR data, on-board sensor data, mission time constraints, fuel quantities, changes to hostile positions, and sensor and communications coverage areas. AIDR automatically fuses track/contact data from overlapping intelligence sources (sensors, IBR 50, and etc.). AIDR 10 is configured to automatically update the mission plan in response to all of the aforementioned input data. Those of ordinary skill in the art will recognize that most tactical military vehicles configured to traverse land, sea, and/or air, typically employ electromagnetic sensor detection systems. One example being, obviously, a radar system. However, data from any suitable sensor system(s) may be fused as described above; the present invention should not be construed as being limited to the example provided.

Figure 4:
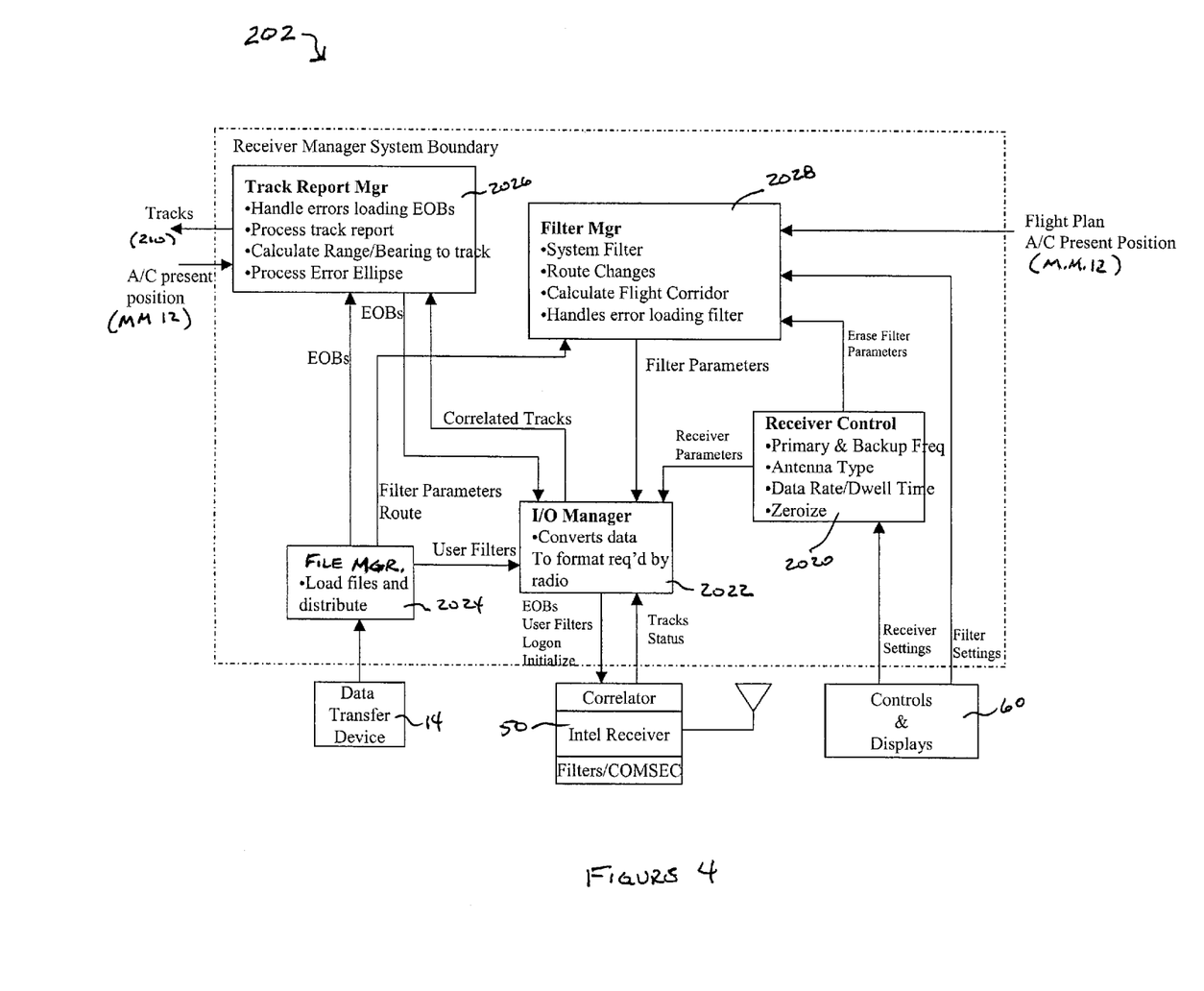
FIG. 4 is a functional block diagram of the Receiver Manager System depicted in FIG. 2 and FIG. 3.

As embodied herein, and depicted in FIG. 4, a functional block diagram of the Receiver Manager System depicted in FIG. 2 and FIG. 3 is shown. As noted above, initialization data is provided by ground based mission planning entity 14 and C/D 60. Before the mission is underway, the operator provides receiver control 2020 with the receiver settings needed by IBR 50 to receive data from the appropriate satellite. For example, this information includes data that includes the primary and backup frequency information, antenna type, data rate, and etc. Other initialization data is provided by file manager 2024, which distributes the initial parameters to I/O manager 2022, track report manager 2026, and filter manager 2028.

Filter manager 2028 performs an important role. It obtains EOB data, route data, and initial filter data from the mission planner 14. Once the mission is underway, filter manager is configured to adjust filter parameters in response to changes to the route, the present position of the aircraft, and to filter setting adjustments made by the operator via C/D 60. Filter manager 2028 provides filter parameters to IBR 50 by way of I/O manager 2022. The filter parameters dictate which tracks are to be provided to track manager 2026.

Track manager 2026 receives the EOB from file manager 2024, present platform position from mission manager 12, and correlated track information from IBR 50 via I/O manager 2022. In response, track manager 2026 processes track data and error ellipse data and provides a calculated three dimension bearing, range, and altitude to each track obtained from IBR 50.

I/O manager converts the data received from file manager 2024, track manager 2026, filter manager 2028, and receiver control 2020 into a format recognized by IBR 50. Essentially, this data allows IBR 50 to receive data from a predetermined satellite on a predetermined satellite channel. It also tells IBR 50 to provide intelligence and track data from the geographical areas corresponding to the filter parameters.

Figure 5:
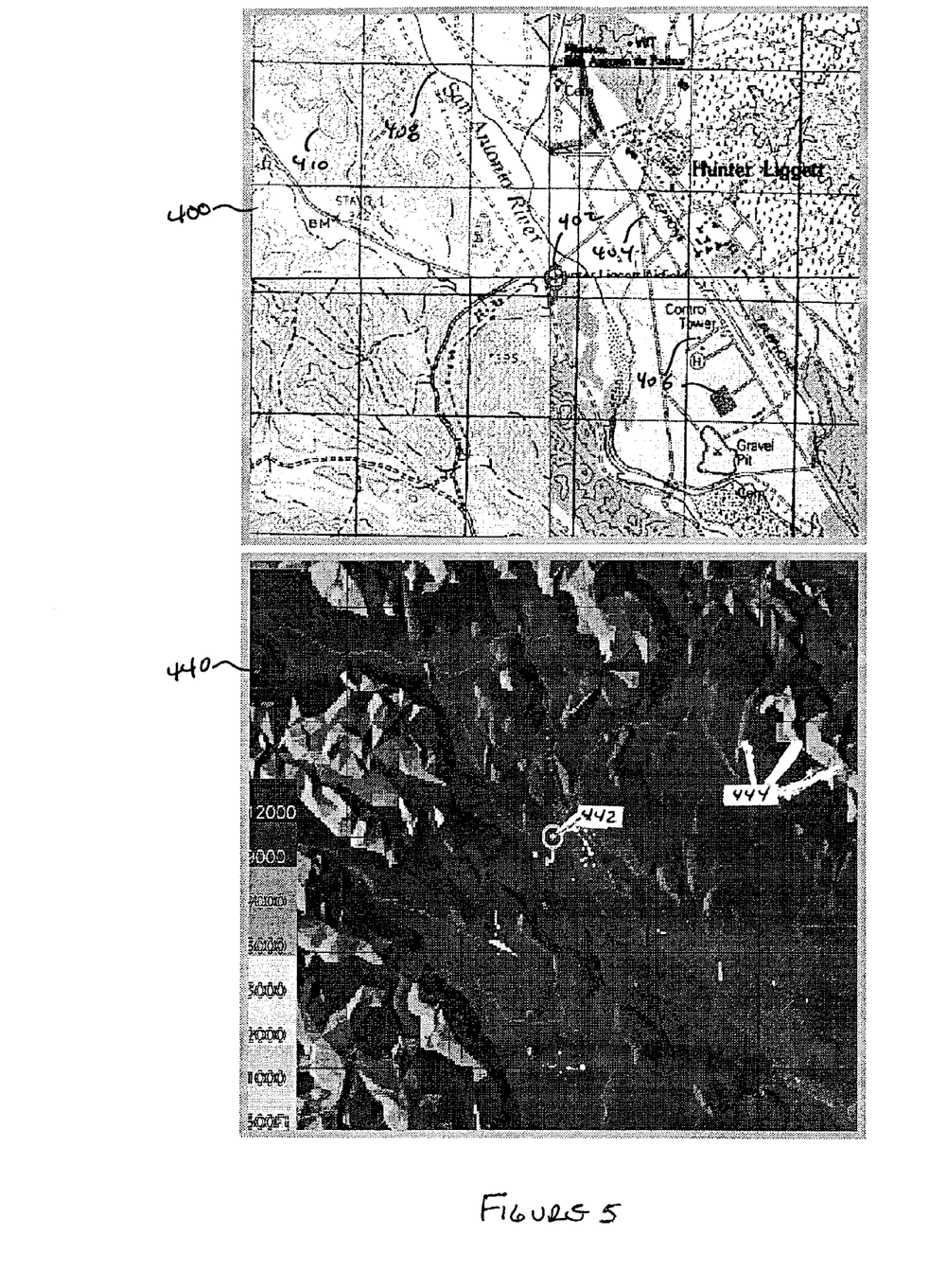
FIG. 5 includes examples of digital map displays in accordance with the present invention.

As embodied herein and depicted in FIG. 5, examples of digital map displays in accordance with the present invention are shown. Digital mapping application 208 increases situational awareness for the operators by providing several operational modes. The modes include a plan image mode, a chart mode, a geo-referenced satellite image mode, and a vector mode. FIG. 5 includes an example of a chart 400 and a digitized terrain elevation map 440. Each maps' center (402, 442) is based on the platform's position, or a fixed offset therefrom. The map can be oriented north or heading up. Chart 400 displays features such as roads 404, structures, 406, bodies of water 408, and elevation data.

Referring to map 440, digital mapping application 208 may provide C/D 60 with a digital terrain elevation display. Elevation variations 444 are shown by color coding. The map's terrain elevation data may be enhanced with sun shading (not shown) as it relates to the terrain elevation data. Sun shading shows the effect of the sun position on terrain variations by shading the terrain based on an angle fixed in the upper left direction relative to the screen. In the elevation banding mode, the map dynamically updates the overlays to provide a smooth corresponding display for changes in aircraft position.

Figure 6:
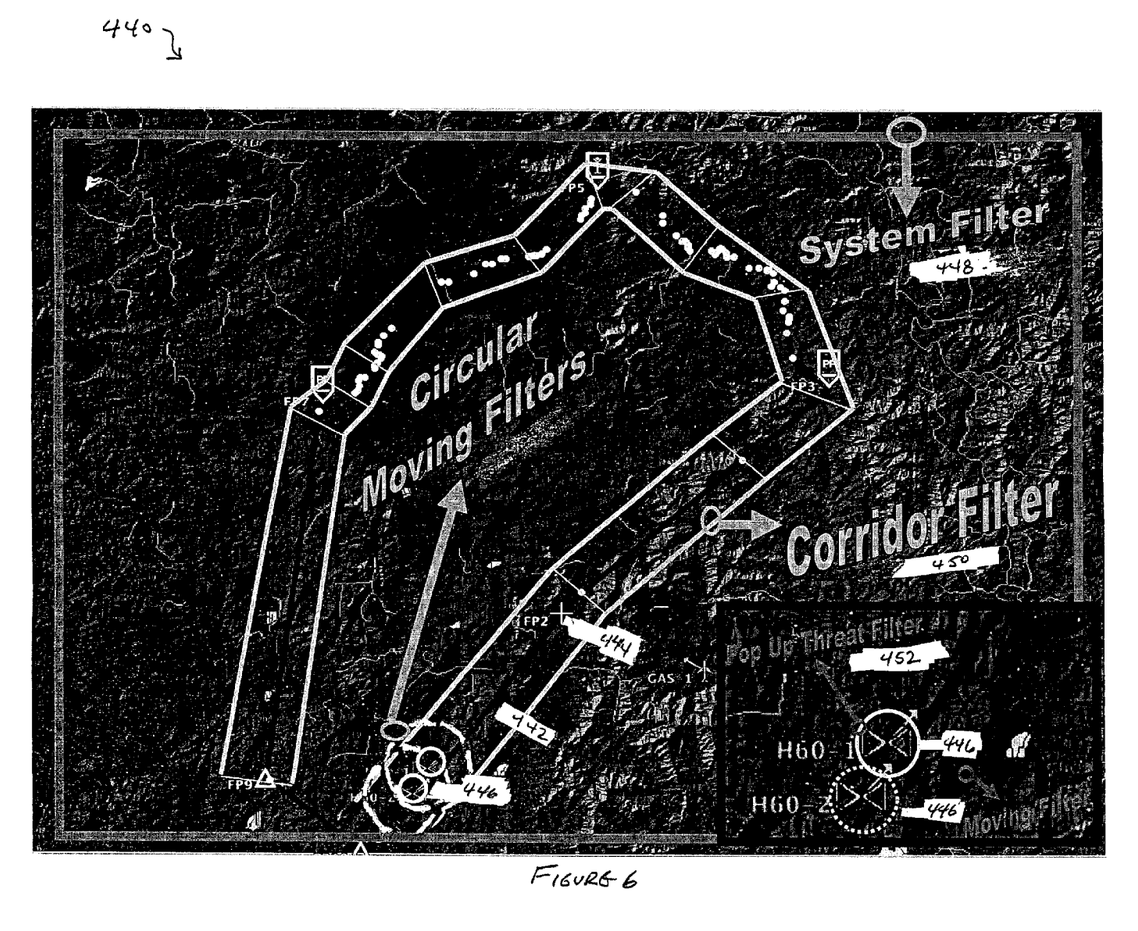
FIG. 6 is an example of a digitized terrain elevation map shown in FIG. 5.

FIG. 6 is an example of digitized terrain elevation map 440 which illustrates some of the features of the present invention.

As shown on chart 400, graphic overlays may be placed on the map, such as routes 442 and symbols such as waypoints 444, and threats 446. Friendly track locations and survivor locations may also be displayed by appropriate symbology. Vector Product Format data may be overlaid on the Plan maps to provide cultural features.

As noted above, filters limit the tracks based on a geographic area of interest for the mission and a corridor around the current flight plan. Intel filters limit the volume of tracks provided to Receiver Management to optimize processor performance. For example, system filter 448 limits track data to a predetermined area of interest. System filter 448 may also be referred to as a geographic filter. Corridor filter 450 may also limit the data to a corridor around the current flight plan. Circular moving filters may also be employed. Finally, pop-up threat filters 452 are operative to alert the operator to the presence of threats 446.

Digital mapping application 208 also includes sub-modes. Elevation banding, sun shading, and contour lines were discussed above. Application 208 also provides intervisibility for threats (not shown). Intervisibility calculations for map threats are performed real-time and displayed as translucent overlays for the threats whose detection range are the closest to the platform's position. Intervisibility is based on 100 m resolution. The intervisibility plots indicate where the terrain shields the user's platform from line-of-sight threats. The map performs its calculations based on the threat location, the threat intervisibility radius, terrain height, and the present altitude of the platform.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A system disposed in a single platform vehicle operating in a tactical environment, the system being configured to automatically change a route of only said single platform vehicle during the execution of a mission by said vehicle, said route consisting of a plurality of route segments, the system comprising:

a receiver component configured to receive intelligence data from at least one of a satellite intelligence source, a ground-based source, an air-based intelligence source, and an intelligence source disposed on an under-sea platform, the intelligence data describing the tactical environment in real-time or in near real-time, said intelligence data including at least one of threat track data, targeting data, friendly forces track data, and combat survivor location data as descriptors of the tactical environment;

a computer coupled to the receiver component, the computer being programmed to process the intelligence data, assess the impact of the intelligence data upon a current route segment and at least one immediately subsequent route segment, which collectively do not comprise the entire planned route, and, if necessary, automatically and dynamically change said route by changing only said current route segment and said at least one immediately subsequent route segment during the execution of a mission by said vehicle; and a display component coupled to the computer, the display component being configured to display at least a portion of the tactical environment and provide at least one visual indicator corresponding to at least one of said changed route segments.

2. The system of claim 1, wherein the computer is coupled to at least one vehicle sensor system.

3. The system of claim 1, further comprising:

an avionics system configured to provide the computer with aircraft state data and provide an aircraft with route implementation commands; and the computer being further programmed to, calculate a new route in response to the intelligence data and the aircraft state data, and provide the avionics system with the new route.

4. The system of claim 3, wherein the threat track data includes at least one of identification data, location data, threat detection radius, weapons status data, heading data, and speed data.

5. The system of claim 4, wherein the display component displays the threat track data and at least a portion of the tactical environment on a digital map.

6. The system of claim 3, wherein the new route is calculated to engage a threat.

7. The system of claim 3, wherein the avionics system includes at least one electromagnetic sensor detection system configured to detect contact entities in the tactical environment.

8. The system of claim 7, wherein the electromagnetic sensor detection system includes radar.

9. The system of claim 7, wherein the computer is further programmed to:
receive an initial electronic order of battle (EOB) data and initial route data from an external source;
fuse the threat track data, friendly track data, and combat survivor location data with the electromagnetic sensor detection system track data and operator entered track data; and
calculate a new threat scenario and a new route in response to the initial EOB, initial route data, and the fused threat track data, friendly track data, combat survivor location data, electromagnetic sensor detection system track data, and operator entered track data.

10. The system of claim 9, wherein the display component is configured to display in real-time, or in near real-time, the new route and the fused threat track data, friendly track data, and combat survivor location data.

11. The system of claim 10, wherein the computer is programmed to filter the fused threat track data, friendly track data, and combat survivor location data based on filter parameters such that fused threat track data, friendly track data, and combat survivor location data excluded by the filter are not provided to the display component.

12. The system of claim 11, wherein the filter parameters include geographic filter parameters, pop-up threat filter parameters, moving filter parameters, and corridor filter parameters.

13. The system of claim 3, wherein the computer is programmed to calculate threat intervisibility based on aircraft position data, threat position data, threat detection radius, and terrain data.

14. The system of claim 3, further comprising a computer readable medium having instructions disposed thereon, the instructions being executable by the computer, the instructions including a set of modular application programs comprising:
a receiver management application configured to manage receiver parameters in response to aircraft state data, threat data, and electronic order of battle (EOB);
a mission plan monitor application configured to compare the aircraft state data with the EOB and the threat data;
a route planning application configured to compute the new route in response to the intelligence data, the EOB, and aircraft state data; and
a digital mapping application configured to provide the display component with a digital map that overlays a graphical depiction of the intelligence data, aircraft state data, and new route data on a digital representation of the tactical environment.

15. The system of claim 14, wherein the receiver parameters include receiver tuning data.

16. The system of claim 15, wherein the tuning data include broadcast satellite channel data.

17. The system of claim 16, wherein the digital representation of the tactical environment includes digitized terrain elevation data.

18. The system of claim 15, wherein the graphical depiction of the intelligence data includes at least one graphical symbol depicting hostile force entities, at least one graphical symbol depicting friendly force entities, and at least one graphical symbol depicting combat survivors.

19. The system of claim 18, wherein the graphical symbols depicting hostile force entities and friendly force entities are configured to provide identification data, location data, threat detection radius, weapons status data, heading data, and/or speed data.

20. The system of claim 14, wherein the digital mapping application is configured to provide the display component with route waypoints and flight plans.

21. The system of claim 14, wherein the digital mapping application is configured to provide the display component with avionic system status data.

22. The system of claim 14, wherein the digital mapping application is configured to provide the display component with aircraft location data, threat detection radius, weapons status data, heading data, and speed data.

23. The system of claim 1, wherein the friendly forces track data includes at least one of identification data, location data, weapons status data, heading data, and speed data.

24. The system of claim 23, wherein the display component displays the friendly forces track data and at least a portion of the tactical environment on a digital map.

25. The system of claim 1, wherein the display component displays combat survivor locations and at least a portion of the tactical environment on a digital map.

26. The system of claim 1, wherein the new route intercepts a combat survivor location.

27. A method automatically and dynamically changing a route of only a single military vehicle during the execution of a mission in a tactical environment, wherein said route includes a plurality of individual route segments, the method comprising the steps of:
receiving intelligence data from a intelligence broadcast, the intelligence data being received from at least one of a satellite intelligence source, a ground-based intelligence source, an air-based intelligence source, and an intelligence source disposed on an under-sea platform, the intelligence data describing the tactical environment in real-time, or in near real-time, the intelligence data including at least one of threat track data, targeting data, friendly forces track data, and combat survivor location data as descriptors of the tactical environment;
processing the intelligence data and assessing the impact of the intelligence data upon a current route segment and at least one immediately subsequent route segment which collectively do not comprise the entire route, and, if necessary, automatically and dynamically changing said route of said single military vehicle by changing only said current route segment and said at least one immediately subsequent route segment during the execution of a mission in a tactical environment;
performing the mission related tasks to effect the mission adjustments; and
displaying at least one visual indicator corresponding to at least one of said changed route segments.

28. The method of claim 27, wherein the intelligence data includes targeting data, such that the new route is specifically calculated to engage a threat.

29. The method of claim 27, wherein the threat track data includes at least one of identification data, location data, threat detection radius, weapons status data, heading data, and speed data.

30. The method of claim 29, wherein the step of displaying includes displaying at least one of the threat track data, friendly forces track data, combat survivor location data, and at least a portion of the tactical environment on a digital map.

31. The method of claim 30, wherein the at least a portion of the tactical environment includes terrain data.

32. The method of claim 27, further comprising the steps of:
receiving an initial electronic order of battle plan and initial route data from an external command entity;
obtaining contact data from at least one user entered report and at least one electromagnetic sensor detection system;
fusing threat track data, friendly track data, and combat survivor location data with the contact data; and
calculating a new threat scenario and a new route in response to the initial EOB, initial route data, and the fused threat track data, friendly track data, combat survivor location data, and the contact data.

33. The method of claim 32, wherein the displaying step includes displaying in real-time, or in near real-time, the new route and the fused threat track data, friendly track data, and combat survivor location data.

34. The method of claim 33, further comprising the step of filtering the correlated threat track data, friendly track data, and combat survivor location data based on filter parameters such that correlated threat track data, friendly track data, and combat survivor location data excluded by the filter are not provided to the display component.

35. The method of claim 33, wherein the filter parameters include geographic filter parameters, pop-up threat filter parameters, moving filter parameters, and corridor filter parameters.

36. The method of claim 27, further comprising the step of calculating threat intervisibility based on aircraft position data, threat position data, threat detection radius, and terrain data.

37. The method of claim 27, wherein the step of displaying includes providing a digital representation of the tactical environment.

38. The method of claim 37, wherein the digital representation of the tactical environment includes digitized terrain elevation data.

39. The method of claim 27, wherein the step of displaying further comprises providing a graphical depiction of the intelligence data.

40. The method of claim 39, wherein the graphical depiction of the intelligence data includes at least one graphical symbol depicting hostile force entities, at least one graphical symbol depicting friendly force entities, and at least one graphical symbol depicting combat survivors.

41. The method of claim 40, wherein the graphical symbols depicting hostile force entities and friendly force entities are configured to provide at least one of identification data, location data, threat detection radius, weapons status data, heading data, and speed data.

42. The method of claim 27, wherein the step of displaying further comprises the step of displaying route waypoints and flight plans.

43. The method of claim 27, wherein the step of displaying further comprises the step of displaying avionic system status data.

44. The method of claim 27, wherein said receiving and processing steps, including the steps of automatically changing only the current route segment and at least one route segment based on the assessed intelligence data is performed irrespective of whether said single vehicle has an autopilot function.

* * * * *